United States Patent
Wang et al.

(10) Patent No.: US 11,528,767 B2
(45) Date of Patent: Dec. 13, 2022

(54) USER EQUIPMENT, RADIO NETWORK NODE AND METHODS PERFORMED THEREIN FOR HANDLING COMMUNICATION IN A WIRELESS COMMUNICATION NETWORK

(71) Applicant: Telefonaktiebolaget LM Ericsson (publ), Stockholm (SE)

(72) Inventors: Min Wang, Luleå (SE); Jan Christoffersson, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 371 days.

(21) Appl. No.: 16/322,026

(22) PCT Filed: Dec. 28, 2018

(86) PCT No.: PCT/SE2018/051369
§ 371 (c)(1),
(2) Date: Jan. 30, 2019

(87) PCT Pub. No.: WO2019/139527
PCT Pub. Date: Jul. 18, 2019

(65) Prior Publication Data
US 2021/0195676 A1    Jun. 24, 2021

Related U.S. Application Data

(60) Provisional application No. 62/615,994, filed on Jan. 11, 2018.

(51) Int. Cl.
*H04W 76/19*  (2018.01)
*H04W 72/12*  (2009.01)
(Continued)

(52) U.S. Cl.
CPC ....... *H04W 76/19* (2018.02); *H04W 72/1268* (2013.01); *H04W 72/14* (2013.01); *H04W 74/0833* (2013.01)

(58) Field of Classification Search
CPC . H04W 76/19; H04W 72/1268; H04W 72/14; H04W 74/0833; H04W 74/002; H04B 7/0695
See application file for complete search history.

(56) References Cited

U.S. PATENT DOCUMENTS

2014/0369322 A1* 12/2014 Fwu ............... H04B 7/0456
                                                    370/336
2018/0138962 A1*  5/2018 Islam ............. H04L 5/0032
(Continued)

OTHER PUBLICATIONS

International Search Report and Written Opinion dated Feb. 27, 2019, for International Application No. PCT/SE2018/051369 filed on Dec. 28, 2018, consisting of 16-pages.
(Continued)

*Primary Examiner* — Steven H Nguyen
(74) *Attorney, Agent, or Firm* — Sage Patent Group

(57) ABSTRACT

Embodiments herein disclose, e.g., a method performed by a user equipment, UE, for handling communication in a wireless communication network, wherein the UE is in a connected mode in a first beam connected to a radio network node. The UE detects a beam failure of the first beam and transmits, to the radio network node, a preamble of a random access procedure in a second beam, wherein the preamble or a random access resource used for the preamble is associated with a beam failure recovery. The UE then receives a random access response, RAR, from the radio network node, wherein the RAR includes an uplink, UL, grant but without a temporary identity that is used by a medium access control, MAC, entity during a random access procedure.

18 Claims, 16 Drawing Sheets

(51) Int. Cl.
*H04W 72/14* (2009.01)
*H04W 74/08* (2009.01)

(56) References Cited

U.S. PATENT DOCUMENTS

| | | | | |
|---|---|---|---|---|
| 2018/0288756 | A1* | 10/2018 | Xia | H04B 7/0695 |
| 2018/0323856 | A1* | 11/2018 | Xiong | H04B 7/088 |
| 2018/0359790 | A1* | 12/2018 | Ingale | H04W 28/16 |
| 2019/0053293 | A1* | 2/2019 | Akoum | H04W 24/10 |
| 2019/0200248 | A1* | 6/2019 | Basu Mallick | H04B 7/0695 |
| 2020/0374960 | A1* | 11/2020 | Deenoo | H04W 72/14 |
| 2021/0007145 | A1* | 1/2021 | Chen | H04W 74/00 |

OTHER PUBLICATIONS

3GPP TSG RAN WG1 Meeting #90bis R1-1718334; Title: Design Details on Beam Failure Recovery; Agenda Item: 7.2.2.4; Source: MediaTek Inc.; Document for: Discussion; Location and Date: Prague, Czechia Oct. 9-13, 2017, consisting of 8-pages.

3GPP TSG RAN WG1 Meeting 91 R1-1720567; Title: Remaining Issues for Beam Failure Recovery Procedure; Agenda Item: 7.2.2.4; Source: ASUSTeK; Document for: Discussion and Decision; Location and Date: Reno, USA Nov. 27, 2017-Dec. 1, 2017, consisting of 4-pages.

3GPP TSG RAN WG2 Meeting #100 R2-1713954; Title: Discussion on the beam failure recovery impact on RAN2; Agenda Item: 10.2.13; Source: ZTE Corporation, Sanechips; Document for: Discussion and Decision; Location and Date: Reno, USA Nov. 27, 2017-Dec. 1, 2017, consisting of 13-pages.

3GPP TSG RAN WG2#AH-1801 R2-1800003; Title: LS to RAN2 on Beam Failure Recovery; Release: Rel-15; Work Item: NR_newRAT-Core; Source: RAN1; To: RAN2; Location and Date: Vancouver, Canada Jan. 22-26, 2018, consisting of 3-pages.

3GPP TSG WG1 Meeting #90bis R1-1718334; Title: Design Details on Beam Failure Recovery; Agenda Item: 7.2.2.4; Source: MediaTek Inc.; Document for: Discussion; Location and Date: Prague, Czechia, Oct. 9-13, 2017, consisting of 8-pages.

3GPP TSG WG1 Meeting 91 R1-1720567; Title: Remaining Issues for Beam Failure Recovery Procedure; Agenda Item: 7 2.2.4; Source: ASUSTek; Document for: Discussion and Decision; Location and Date: Reno, USA, Nov. 27-Dec. 1, 2017, consisting of 4-pages.

3GPP TSG WG2 Meeting #100 R2-1713954; Title: Discussion on the beam failure recovery impact on RAN2; Agenda Item: 10.2.13; Source: ZTE Corporation, Sanechips; Document for: Discussion and Decision; Location and Date Reno, USA, Nov. 27-Dec. 1, 2017, consisting of 13-pages.

3GPP TSG WG2#AH-1801 R2-1800003; Title: LS to RAN2 on Beam Failure Recovery; Release: Rel-15; Work Item: MR_newRAT-Core; Source: RAN1; Location and Date: Vancouver, Canada, Jan. 22-26, 2018, consisting of 3-pages.

3GPP TS 38.213 V15.0.0; 3rd Generation Partnership Project;Technical Specification Group Radio Access Network; NR;Physical layer procedures for control (Release 15); Dec. 2017, consisting of 56-pages.

3GPP TS 38.321 V15.0.0; 3rd Generation Partnership Project; Technical Specification Group Radio Access Network; NR; Medium Access Control (MAC) protocol specification (Release 15); Dec. 2017, consisting of 55-pages.

* cited by examiner

USER EQUIPMENT, RADIO NETWORK NODE AND METHODS PERFORMED THEREIN FOR HANDLING COMMUNICATION IN A WIRELESS COMMUNICATION NETWORK

CROSS-REFERENCE TO RELATED APPLICATIONS

This application is a Submission Under 35 U.S.C. § 371 for U.S. National Stage Patent Application of International Application Number: PCT/SE2018/051369, filed Dec. 28, 2018 entitled "USER EQUIPMENT, RADIO NETWORK NODE AND METHODS PERFORMED THEREIN FOR HANDLING COMMUNICATION IN A WIRELESS COMMUNICATION NETWORK," which claims priority to U.S. Provisional Application No. 62/615,994, filed Jan. 11, 2018," the entireties of all of which are incorporated herein by reference.

TECHNICAL FIELD

Embodiments herein relate to a user equipment (UE), a radio network node and methods performed therein regarding wireless communication. In particular, embodiments herein relate to handling communication, e.g. transmitting random access responses (RAR), in a wireless communication network.

BACKGROUND

In a typical wireless communication network, user equipments (UE), also known as wireless communication devices, mobile stations, stations (STA) and/or wireless devices, communicate via a Radio Access Network (RAN) to one or more core networks (CN). The RAN covers a geographical area which is divided into service areas, also referred to as cells, with each service area being served by a radio network node e.g., a Wi-Fi access point or a radio base station (RBS), which in some networks may also be called, for example, a gNodeB, a NodeB, or an eNodeB. The service area is a geographical area where radio coverage is provided by the radio network node. The radio network node operates on radio frequencies to communicate over an air interface with the UEs within range of the radio network node. The radio network node communicates over a downlink (DL) to the UE and the UE communicates over an uplink (UL) to the radio network node.

A Universal Mobile Telecommunications network (UMTS) is a third generation (3G) telecommunications network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for e.g. third generation networks, and investigate enhanced data rate and radio capacity and upcoming generation networks. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3GPP and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

With the emerging 5G technologies such as New Radio (NR), the use of very many transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

The evolving 5G standard New Radio (NR) is aiming to operate in a wide range of frequencies from below 1 GHz up to 100 GHz. In NR, beam failure recovery (BFR) is used to enable quick recovery from a beam failure. Beam failure may occur for different reasons, such as a sudden blocking of a DL beam or inefficient beam management procedures.

A BFR process consists of several actions, see FIG. 1. In a first action, beam failure detection at the UE is done in layer one (L1) when e.g. a block error rate (BLER) of a physical downlink control channel (PDCCH) is above a threshold for a certain time. BLER is a ratio of number of erroneous blocks to the total number of blocks received.

In a second action, new candidate beams are identified by measuring beam identification reference symbols or signals, such as channel state information—reference signal (CSI-RS) which are above a threshold with respect to signal strength or quality such as reference signal received power (RSRP) or reference signal received quality (RSRQ), such as signal to interference plus noise ratio (SINR), on the CSI-RS.

In a third action, layer two (L2) is provided, from the L1, with the set of candidate beams and a BFR process is triggered which will initiate a random access (RA) procedure.

Typically, this will trigger a contention free random access (CFRA) where the UE uses a dedicated preamble over a selected beam out of the set of candidate beams. In case the UE has no dedicated preamble for BFR, contention based random access (CBRA) may be used instead.

In a next action, the radio network node, referred to as gNodeB (gNB) in NR, transmits, back to the UE, a response to the BFR for e.g. confirming allowed access.

The LTE random access procedure comes in two forms, allowing access to be either contention-based, implying an inherent risk of collision, or contention-free. In contention-based random access (CBRA), a preamble, also referred to as preamble sequence, is randomly chosen by the UE, which may result in that more than one UE simultaneously transmits the same preamble, leading to a need for a subsequent contention resolution process.

The CBRA procedure, shown in FIG. 2, consists of four actions:
1. Preamble transmission;
2. Random access response transmission;
3. Transmission of message 3 (MSG3);
4. Contention resolution message.

Preamble transmission: The UE selects one of a set of sequences e.g. 64-Z Physical Random Access Channel (PRACH) contention-based sequences, wherein Z is the number of sequences allocated, by the radio network node, for contention-free preambles. The set of contention-based sequences, also referred to as signatures, is further subdivided into two subgroups, so that the choice of preamble can carry one bit of information relating to the amount of transmission resource needed to transmit Message 3. The broadcast system information indicates which sequences are in each of the two subgroups, each subgroup corresponding to one value of the one bit of information, as well as the meaning of each subgroup. The UE selects a sequence from the subgroup corresponding to a size of transmission resource needed for the appropriate Random Access Channel (RACH) use case. It should be noted that some use cases require only a few bits to be transmitted in MSG3, so choosing the small message size avoids allocating unnecessary uplink resources, such as time and/or frequency.

Random Access Response (RAR) transmission: The RAR conveys the identity of the detected preamble called random access preamble identity (RAPID), a timing alignment instruction to synchronize subsequent uplink transmissions from the UE, an initial uplink resource grant for transmission of the Step 3 message, and an assignment of a temporary Cell Radio Network Temporary Identifier (T-C-RNTI), which may or may not be made permanent as a result of the next step called contention resolution. The RAR may also be scrambled with a Random access Radio Network Temporary Identifier (RA-RNTI) when the RAR was detected and indicates the PRACH resource when the preamble was transmitted. The UE expects to receive the RAR within a time window, of which time window the start and end are configured by the radio network node and broadcast as part of the cell-specific system information (SI). If the UE does not receive a RAR within the configured time window, it selects another sequence or preamble to be transmitted again.

Message 3 transmission: This message is the first scheduled uplink transmission on the Physical Uplink Shared Channel (PUSCH) and makes use of Hybrid Automatic Repeat Request (HARQ). It is addressed to the T-C-RNTI allocated in the RAR. In case of a preamble collision having occurred at Step 1, the colliding UEs will receive the same T-C-RNTI through the RAR and will also collide in the same uplink time-frequency resources when transmitting their layer 2 (L2) and/or layer 3 (L3) messages. This may result in such interference that no transmissions from colliding UEs can be decoded, and the UEs restart the random access procedure after reaching the maximum number of HARQ retransmissions. However, if a transmission of one UE is successfully decoded, the contention remains unresolved for the other UEs. The following downlink message, in Step 4, allows a quick resolution of this contention.

Contention-resolution: The contention resolution message uses HARQ. It is addressed to a cell-RNTI (C-RNTI), if indicated in the MSG.3 message, or to the T-C-RNTI, and, in the latter case, echoes the UE identity contained in MSG.3. In case of a collision followed by successful decoding of the MSG.3, the HARQ feedback is transmitted only by the UE which detects its own UE identity (or C-RNTI); other UEs understand there was a collision, transmit no HARQ feedback, and can quickly exit the current random access procedure and start another one.

The RAR format is specified for e.g. NR in the following manner. As specified in the medium access control (MAC) spec TS 38.321 v15.0.0, a MAC protocol data unit (PDU) consists of one or more MAC subPDUs and optionally padding. Each MAC subPDU comprises one of the following:
  a MAC subheader with Backoff Indicator (BI) only;
  a MAC subheader with RAPID only (i.e. acknowledgment for SI request); and
  a MAC subheader with RAPID and MAC RAR.

A MAC subheader with Backoff Indicator consists of five header fields E/T/R/R/BI as described in FIG. 3. The E field indicates an extension field indicating whether there is another field following the subheader or not, the R field indicates a reserved field indicating that it does not have any special meaning for now, and the T field indicates a type field which may be a flag indicating whether the MAC subheader contains a random access preamble identity or a Backoff Indicator. A MAC subPDU with Backoff Indicator only is placed at the beginning of the MAC PDU, if included. 'MAC subPDU(s) with RAPID only' and 'MAC subPDU(s) with RAPID and MAC RAR' can be placed anywhere between MAC subPDU with Backoff Indicator only, if any, and padding, if any.

A MAC subheader with RAPID consists of three header fields E/T/RAPID as described in FIG. 4.

Padding is placed at the end of the MAC PDU if present. Presence and length of padding is implicitly based on transport block (TB) size, size of MAC subPDU(s).

FIG. 5 shows an example of a MAC PDU consisting of MAC subPDUs with RAPID and MAC RARs.

The MAC RAR is of a fixed size as depicted in FIG. 6, and consists of the following fields:
  Timing Advance Command (TAC): The Timing Advance Command field indicates an index value TA used to control the amount of timing adjustment that the MAC entity has to apply in TS 38.213 [6]. The size of the Timing Advance Command field is 12 bits;
  UL Grant: The Uplink (UL) Grant field indicates the resources to be used on the uplink in e.g. TS 38.213 [6]. The size of the UL Grant field is 20 bits;
  Temporary C-RNTI: The Temporary C-RNTI field indicates the temporary identity that is used by the MAC entity during Random Access. The size of the Temporary C-RNTI field is 16 bits.

The MAC RAR is octet aligned as shown in FIG. 6.

The current RAR message comprising information such as timing advance command, the UL grant, and the temporary C-RNTI works in this case when the network receives a BFR. Upon reception of a CBRA based BFR, as a baseline option, the radio network node replies with an ordinary RAR carrying RAPID, timing advance command, the grant and the temporary C-RNTI.

SUMMARY

It is not efficient in terms of MAC overhead using the current RAR. An object of embodiments herein is to provide a mechanism that efficiently handles communication such as a random access procedure of a UE in a wireless communication network.

According to an aspect the object is achieved by providing a method performed by a user equipment, UE, for handling communication in a wireless communication network. The UE is in a connected mode connected to a radio network node. The UE detects a beam failure (BF) of a first beam and transmits, to the radio network node, a preamble of a random access procedure in a second beam, wherein the preamble or a random access resource used for the preamble is associated with a beam failure recovery (BFR). The UE receives a random access response, RAR, from the radio network node, wherein the RAR comprises an UL grant and is lacking a temporary identity that is used by a medium access control (MAC) entity during a random access procedure e.g. a T-C-RNTI i.e. the RAR is without a T-C-RNTI.

According to another aspect the object is achieved by providing a method performed by a radio network node for handling communication of a UE in a wireless communication network. The UE is in a connected mode connected to the radio network node. The radio network node receives a preamble of a random access procedure, wherein the preamble is associated with a BFR. The radio network node transmits a random access response, which random access response comprises at least an uplink, UL, grant and lacks a temporary identity that is used by a MAC entity during a random access procedure e.g. a T-C-RNTI i.e. the radio network node omits adding the T-C-RNTI to the RAR. This is thus performed when the preamble is associated with a beam failure recovery process. E.g. the radio network node receives a preamble from the UE. From said preamble, or resources carrying the preamble, the radio network node may determine that the preamble is for BFR and to omit adding the temporary identity and add at least the UL grant into the RAR and then the radio network node transmits the RAR to the UE. To identify that the preamble of the random access is for a BFR, a special set of random access resources e.g. PRACH resources, such as preamble, time and/or frequency resources, may be used for the random access procedure. The random access resources used for the RA procedure associated with the BFR process may be different than random access resources used for a random access procedure related to other reasons. In this way the radio network node may deduce if the RA is for BFR or for something else. Since the UE is in connected mode the timing may be aligned already and the UE has a C-RNTI so the UE will not need the T-C-RNTI.

It is furthermore provided herein a computer program product comprising instructions, which, when executed on at least one processor, cause the at least one processor to carry out any of the methods above, as performed by the radio network node or the UE, respectively. It is additionally provided herein a computer-readable storage medium, having stored thereon a computer program product comprising instructions which, when executed on at least one processor, cause the at least one processor to carry out the method according to any of the methods above, as performed by the radio network node or the UE, respectively.

According to still another aspect the object is achieved by providing a user equipment for handling communication in a wireless communication network. The user equipment is configured to detect a BF of a first beam when the UE is in connected mode being connected to a radio network node. The UE is further configured to transmit, to the radio network node, a preamble of a random access procedure in a second beam, wherein the preamble or a random access resource used for the preamble is associated with a beam failure recovery. The UE is also configured to receive a RAR from the radio network node, wherein the RAR comprises an UL grant and is lacking a temporary identity that is used by a MAC entity during a random access procedure such as a T-C-RNTI e.g. the RAR is without a T-C-RNTI.

According to yet another aspect the object is achieved by providing a radio network node for handling communication of a UE in a wireless communication network. The radio network node is configured to receive, from the UE being in a connected mode, of a first beam, connected to the radio network node, a preamble of a random access procedure of a second beam, wherein the preamble or a random access resource used for the preamble is associated with a BFR. The radio network node is further configured to transmit a random access response, which random access response comprises at least an uplink, UL, grant and lacks a temporary identity that is used by a medium access control, MAC, entity during a random access procedure, e.g. a temporary cell radio network temporary identifier, T-C-RNTI, hence the radio network node is configured to omit adding the T-C-RNTI to the RAR.

Embodiments herein describe methods used for during beam failure e.g. BFR. The UL grant may be sufficient in the case where the UE is in connected mode which means that the UE already has a C-RNTI and the timing is already aligned. Thus, an improved RAR format is herein disclosed comprising: only the field of UL grant in case the UE MAC has detected a beam failure, e.g. while the uplink time alignment is still being maintained; the field of the UL grant and the TAC field and/or a beam index field. This results in a reduced MAC overhead by not using unnecessary fields such as T-C-RNTI field which may mean an improved network coverage for RACH accesses and/or energy consumed during random access (RA) signalling. Embodiments herein reduce the unnecessary MAC overhead for BFR triggered RACH access. It is especially useful for a UE in a coverage limited scenario.

BRIEF DESCRIPTION OF THE DRAWINGS

Embodiments will now be described in more detail in relation to the enclosed drawings, in which.

DETAILED DESCRIPTION

Figure 1:
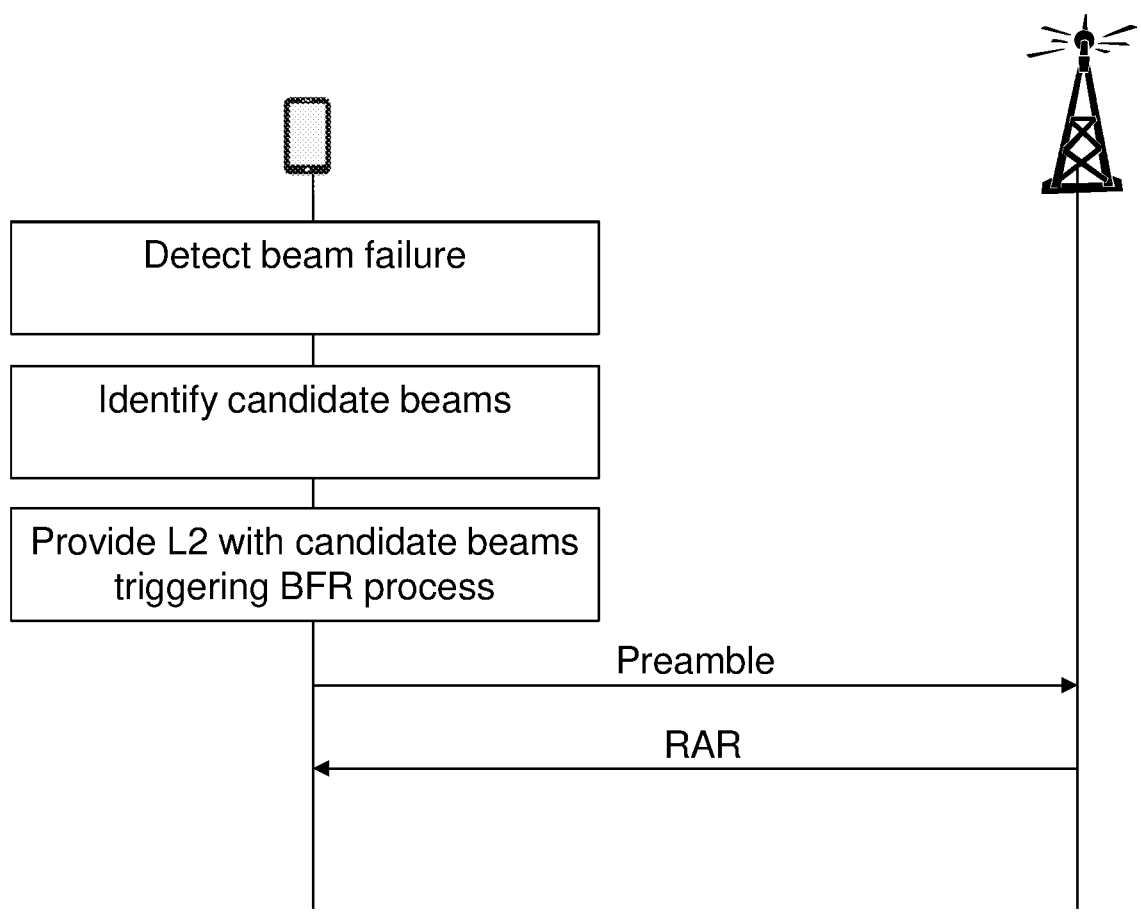
FIG. 1 shows a schematic overview of a BFR.
Figure 2:
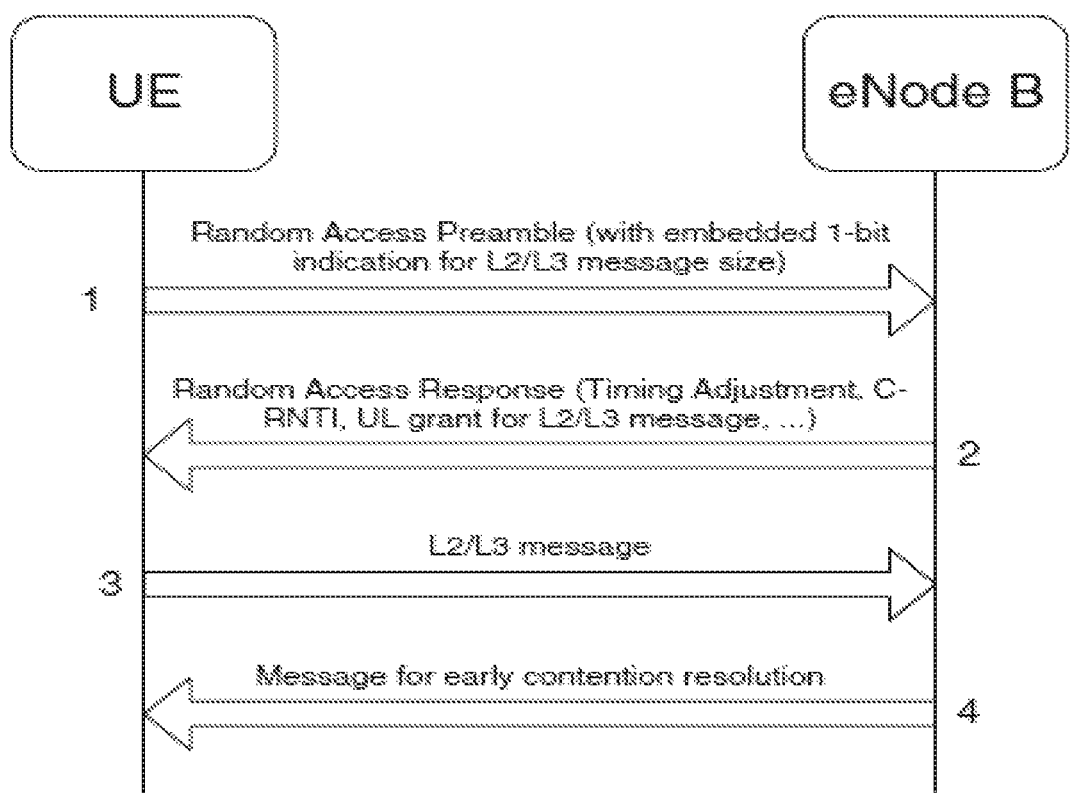
FIG. 2 shows an overview of the RA procedure in LTE.
Figure 3:
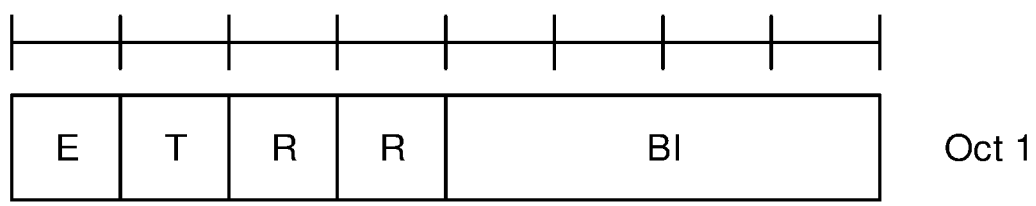
FIG. 3 is a schematic overview depicting a MAC sub-PDU.
Figure 4:
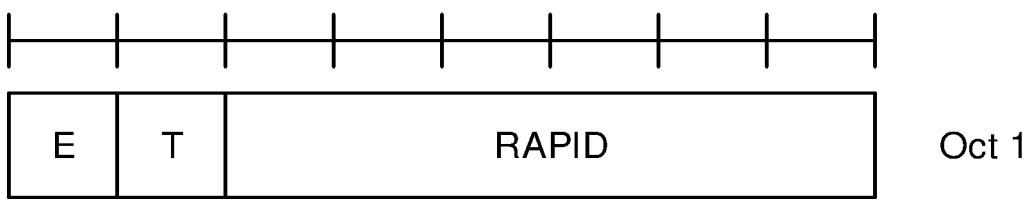
FIG. 4 is a schematic overview depicting a MAC sub-PDU.
Figure 5:
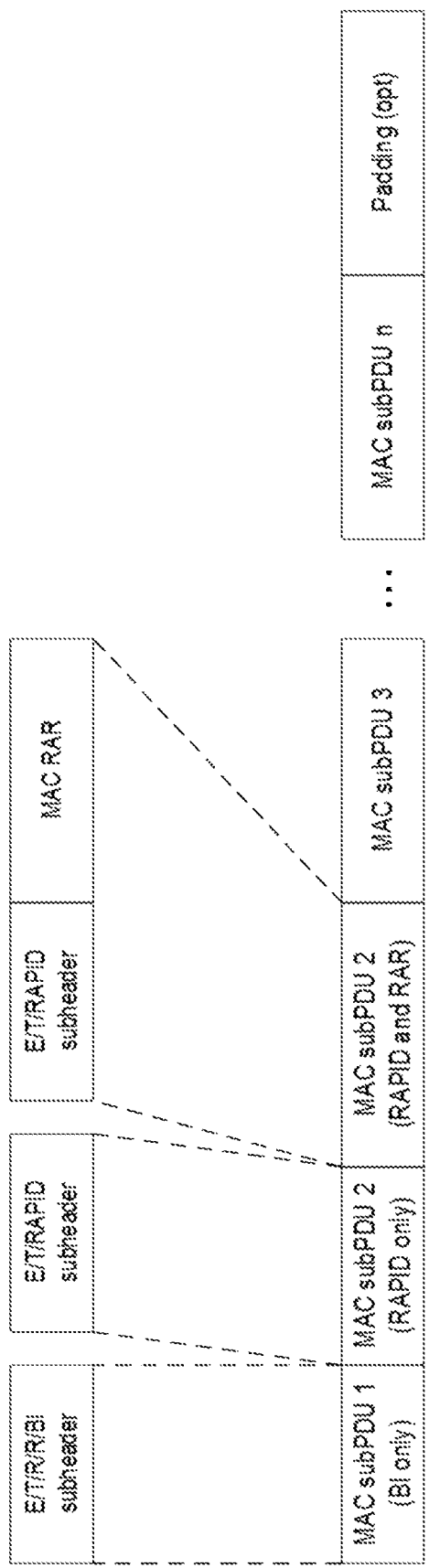
FIG. 5 is a schematic overview depicting a MAC PDU.
Figure 6:
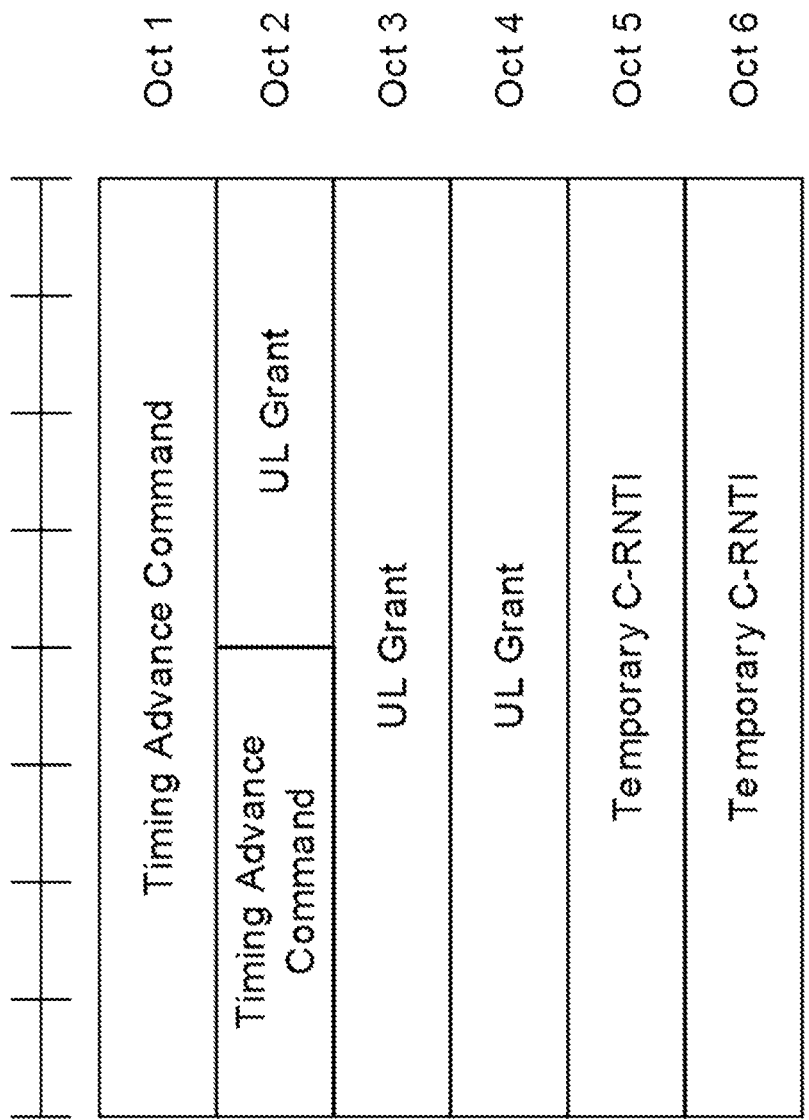
FIG. 6 is a schematic overview depicting a MAC RAR.
Figure 7:
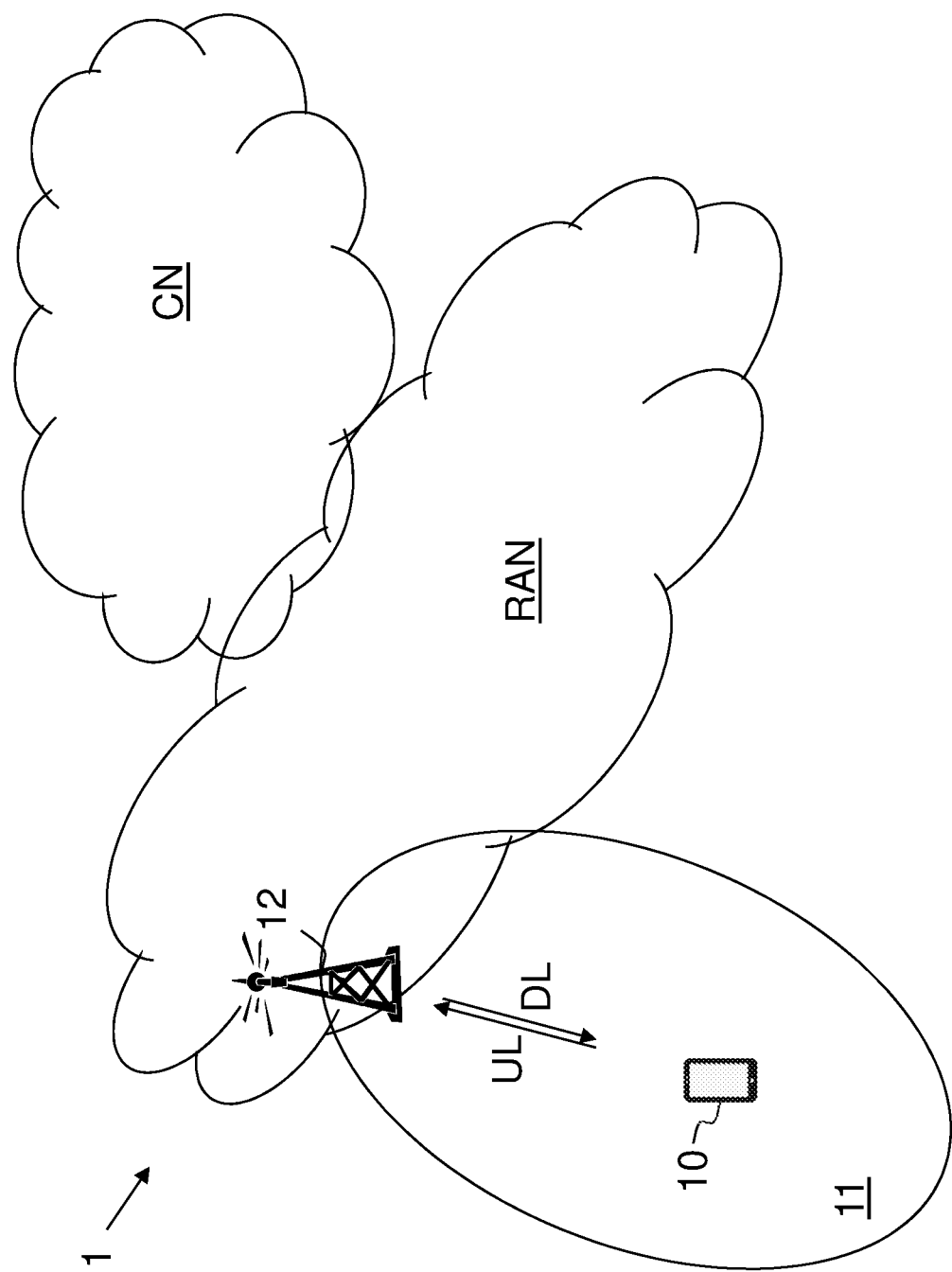
FIG. 7 is a schematic overview depicting a wireless communication network according to embodiments herein.

Embodiments herein relate to wireless communication networks in general. FIG. 7 is a schematic overview depicting a wireless communication network 1. The wireless communication network 1 comprises one or more RANs and one or more CNs. The wireless communication network 1 may use one or a number of different technologies. Embodiments herein relate to recent technology trends that are of particular interest in a 5G context; however, embodiments are also applicable in further development of existing wireless communication systems such as e.g. Wideband Code Division Multiple Access (WCDMA) and LTE.

In the wireless communication network 1, UEs e.g. a UE 10 such as a mobile station, a non-access point (non-AP) STA, a STA, a user equipment and/or a wireless terminal, communicate via one or more Access Networks (AN), e.g. RAN, to one or more core networks (CN). It should be understood by the skilled in the art that "UE" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station capable of communicating using radio communication with a radio network node within an area served by the radio network node.

The wireless communication network 1 comprises a radio network node 12 providing radio coverage over a geographical area, a first service area 11, of a first radio access technology (RAT), such as NR, LTE, or similar. The radio network node 12 may be a transmission and reception point e.g. a radio network node such as a Wireless Local Area Network (WLAN) access point or an Access Point Station (AP STA), an access node, an access controller, a base station, e.g. a radio base station such as a gNodeB (gNB), an evolved Node B (eNB, eNode B), a base transceiver station, a radio remote unit, an Access Point Base Station, a base station router, a transmission arrangement of a radio base station, a stand-alone access point or any other network unit or node capable of communicating with a UE within the area served by the radio network node 12 depending e.g. on the first radio access technology and terminology used. The radio network node 12 may alternatively or additionally be a controller node or a packet processing node such as a radio controller node or similar. The radio network node may be referred to as a serving radio network node wherein the first service may be referred to as a serving cell, and the serving network node communicates with the UE 10 in form of DL transmissions to the UE 10 and UL transmissions from the UE 10. It should be noted that a service area may be denoted as cell, beam, beam group or similar to define an area of radio coverage. The radio network node 12 transmits reference signals, such as SSBs or channel state information reference signal (CSI-RS), over the service area. Each SSB or CSI-RS being associated with a beam e.g. each SSB or CSI-RS is representing a respective beam. Hence, the radio network node 12, 13 transmits SSBs or CSI-RSs repeatedly, in time, in a large number of different directions using e.g. as many transmission-beams as deemed necessary to cover an operational area of the respective radio network node.

According to embodiments herein the UE 10 is in a connected mode, i.e. the UE 10 may be radio resource control (RRC) connected e.g. has a RRC connection, with the radio network node 12. The UE 10 detects a BF e.g. a signal strength of a signal of a first beam is below a set threshold. The UE 10 then transmits a preamble of a random access procedure in a second beam, wherein the preamble or a random access resource used for the preamble is associated with a BFR, e.g. the transmission of the preamble uses random access resources such as frequency and/or time (or a preamble) allocated for random access for a BFR. The radio network node 12 receives the preamble and detects that the preamble is associated with a BFR. The radio network node 12 then transmits a RAR comprising at least an UL grant and lacking a temporary identity that is used by a MAC entity during a random access procedure such as a T-C-RNTI. Since the UE 10 was in connected mode it is sufficient with the UL grant in the RAR for the UE 10 to be able to use the second beam for transmissions. Hence, the overhead of the RAR is reduced and radio resources used as well as energy consumption are reduced.

Figure 8:
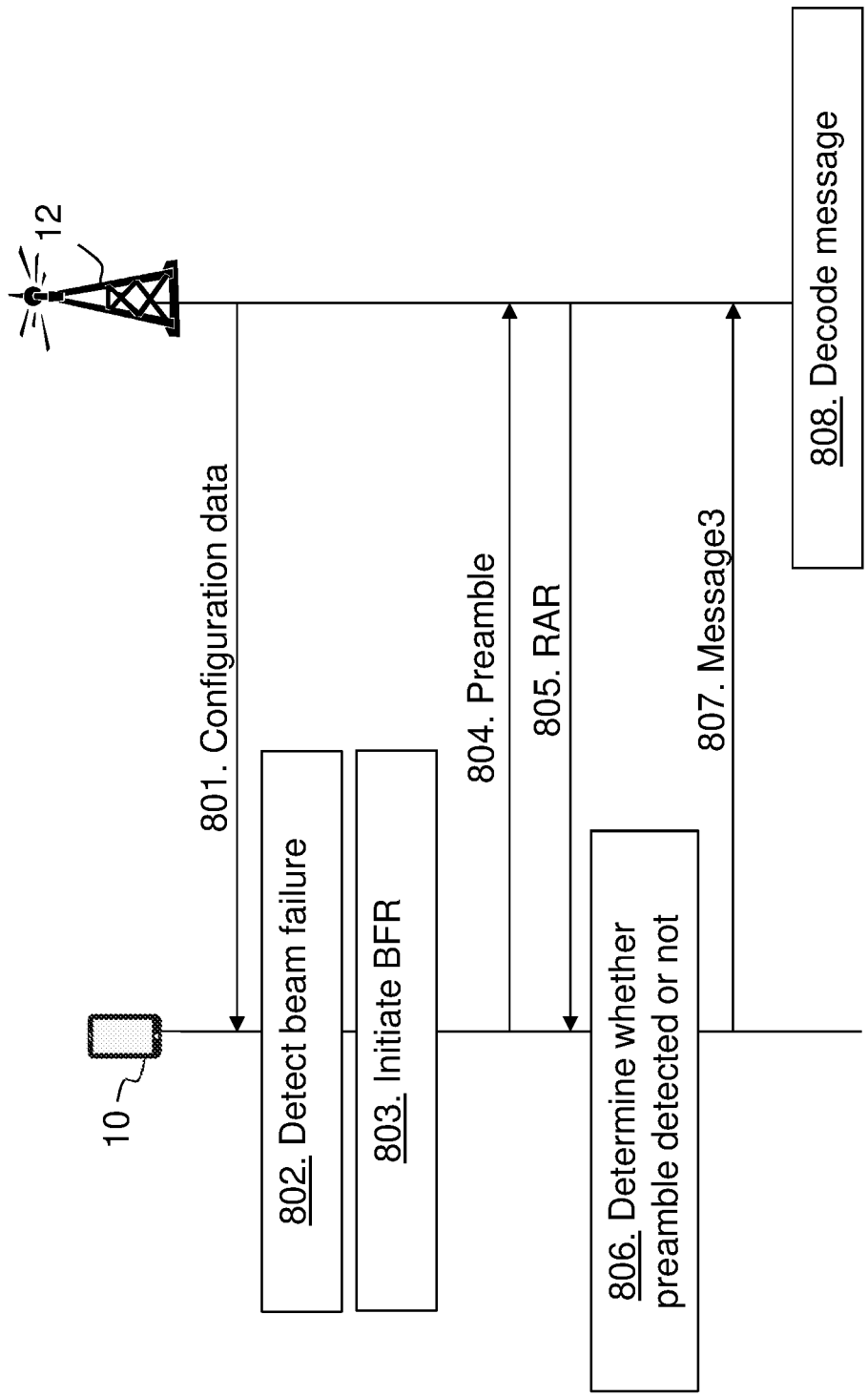
FIG. 8 shows a combined flowchart and signalling scheme according to embodiments herein.

FIG. 8 is a combined flowchart and signalling scheme according to embodiments herein.

Action 801. The radio network node 12 may configure the UE 10 by transmitting configuration data indicating the configuration of the RAR to the UE 10 via e.g. Radio Resource Control (RRC) messages. The configuration data may indicate whether to use an ordinary RAR format, which carries fields such as Timing Advance Command, UL grant and Temporary C-RNTI, or a different RAR format disclosed herein for a random access procedure associated with a BFR. The configuration data may comprise one or more random access resources such as preamble, time and/or frequency for a BFR. The one or more random access resources may also be preconfigured at the UE 10. The configuration of the RAR may be signalled in system information and/or signalled/updated via a MAC Control Element (CE), PDCCH command or other L1/L2 signalling alternatives.

Action 802. The UE 10 detects a beam failure of the first beam. E.g. the UE detection may be done in L1 when e.g. a BLER of the PDCCH is above a threshold for e.g. a pre-set time.

Action 803. The UE 10 may then initiate a BFR. E.g. the UE 10 may select a second beam to perform BFR on. The second beam may be selected based on signal strength and/or quality. The second beam may thus be identified by measuring beam identification reference symbols or signals (RS), such as CSI-RS, which are above a threshold with respect to signal strength or quality such as RSRP or RSRQ, such as SINR, on the RS.

Action 804. The UE 10 transmits a preamble in the second beam, being different than the first beam, during a random access procedure for the second beam. The preamble or a random access resource, such as time and frequency, used for the preamble is associated with a beam failure recovery e.g. since these may be allocated for BFR processes.

Action 805. The network node 12 identifies the random access procedure as a random access procedure for a BFR process and responds to the UE 10 with the RAR. The RAR carries the UL grant and/or timing advance command but lacks at least the temporary identity such as a T-C-RNTI.

Action 806. The UE 10 may then determine that the RAR is intended for the UE based on e.g. RAPID or RA-RNTI in the RAR.

Action 807. The UE may then transmit a message, e.g. message 3, to the radio network node 12 in the second beam according to the UL grant in the RAR. This message is a first scheduled uplink transmission on the PUSCH and may make use of HARQ.

Action 808. The transmission of the UE 10 may then successfully be decoded at the radio network node 12.

Figure 9B:
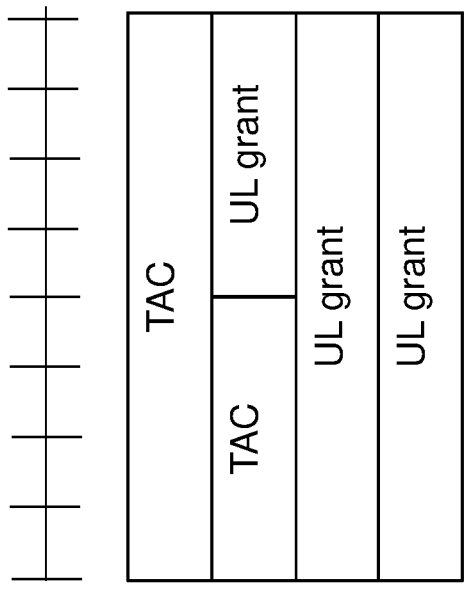
FIG. 9A-9C show different MAC RARs according to embodiments herein.
Figure 9C:
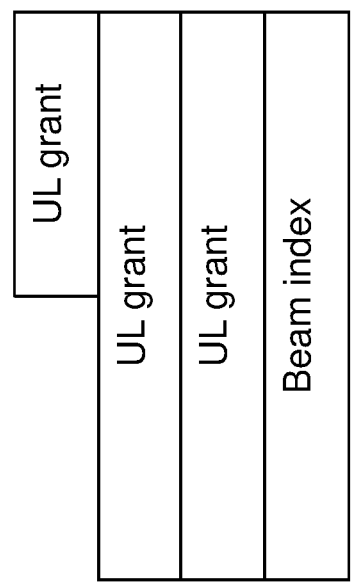
Figure 9A:
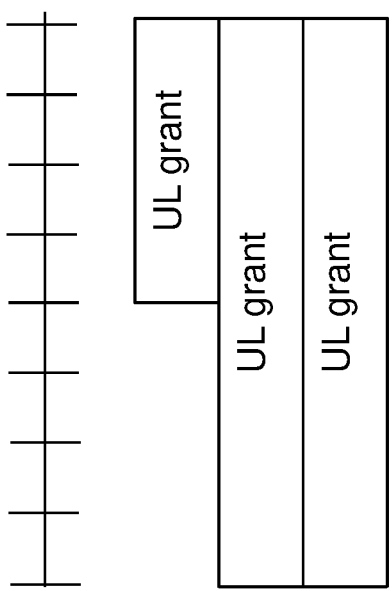

FIG. 9A discloses one embodiment out of a number of various embodiments for the MAC RAR. The radio network node 12 may, as a Random access response for a BFR triggered random access procedure, transmit a MAC PDU comprising one or more MAC subPDUs and optionally padding. Each MAC subPDU may comprise one of the following:

a MAC subheader with Backoff Indicator only;
a MAC subheader with RAPID only, i.e. acknowledgment for SI request; and
a MAC subheader with RAPID and MAC RAR.

According to embodiments herein the MAC RAR has an improved format comprising e.g. only the field of UL grant, which may have a size of 20 bits. This improved format is applied in case the UE 10 has detected a beam failure of the first beam, while the uplink time alignment is still being maintained since the UE is in connected state.

Alternatively, the RAR format according to embodiments herein may comprise fields including Timing Advance Command, and UL grant, see FIG. 9B. This format may be applied in case the UE has detected a beam failure, while the uplink time alignment is also lost. This may be indicated in the preamble transmission.

Alternatively or additionally, besides the fields that are described in the above embodiments, the RAR format may comprise an additional field indicating beam index, wherein the additional field indicates the index for a new serving beam that the radio network node 12 may assign to the UE 10 see FIG. 9C. The additional field may be 6-8 bits. The radio network node 12 may configure the UE 10 whether to use the ordinary RAR format, which carries fields Timing Advance Command, UL grant and Temporary C-RNTI, or the improved RAR format. The configuration on the RAR format may be signalled to the UE 10, by the radio network node 12, via system information or dedicated RRC signalling.

Figure 10:
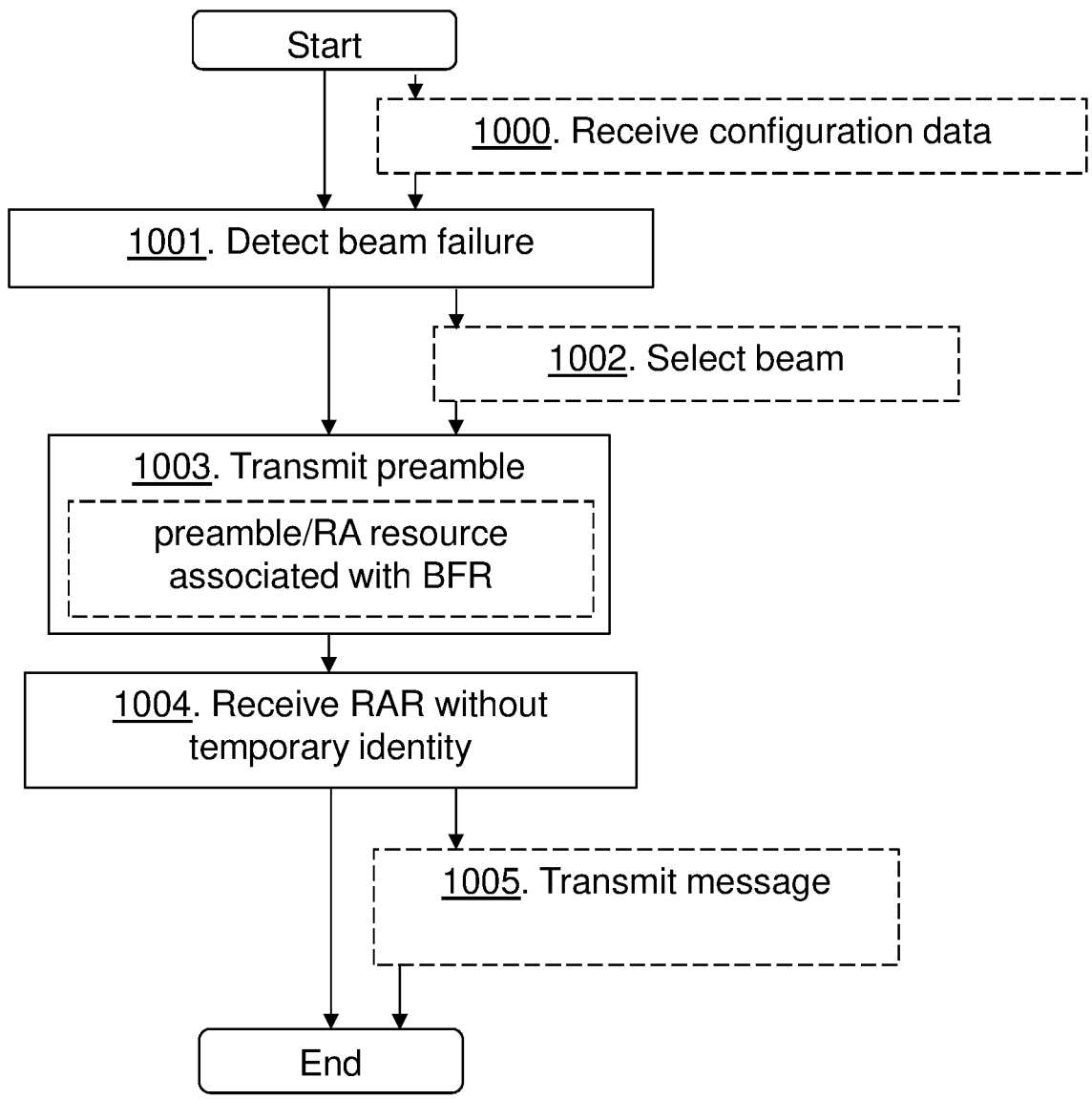
FIG. 10 shows a schematic flowchart depicting a method performed by a UE according to embodiments herein.

The method actions performed by the UE 10 for handling communication, e.g. performing access related process or similar, in the wireless communication network 1 according to embodiments will now be described with reference to a flowchart depicted in FIG. 10. The actions do not have to be taken in the order stated below, but may be taken in any suitable order. Actions performed in some embodiments are marked with dashed boxes. The UE 10 is in a connected mode in the first beam connected to the radio network node 12. E.g. the UE 10 is connected to the radio network node e.g. RRC connected and using the first beam.

Action 1000. The UE 10 may receive configuration data from the radio network node 12, configuring the UE 10 to use a RAR format with temporary identifier or not upon beam failure.

Action 1001. The UE 10 detects the BF of the first beam.

Action 1002. The UE 10 may select the second beam e.g. based on measured signal strength or quality of candidate beams.

Action 1003. The UE 10 transmits, to the radio network node 12, a preamble of a random access procedure in the second beam, wherein the preamble or the random access resource used for the preamble is associated with a BFR. The preamble or the random access resource used for the preamble may be associated with the beam failure recovery in that the preamble may be of the set of predetermined preambles or the random access resource, used when transmitting the preamble, is of the set of predetermined random access resources. Thus, the preamble or a random access resource may be preconfigured for BFR.

Action 1004. The UE 10 receives the RAR, from the radio network node 12, wherein the RAR comprises the UL grant but without a temporary identity that is used by a MAC entity during a random access procedure. Thus the RAR may comprise an UL grant and is lacking e.g. a temporary C-RNTI i.e. the RAR is without a T-C-RNTI. The RAR may further lack timing advance command. Since the UE 10 is in connected mode the UE 10 may use RA-RNTI to determine that the RAR is intended for the UE 10. Thus, RA-RNTI is determined by the preamble or PRACH resource where preamble was sent and the UE already has C-RNTI since it is in connected mode, sent in an msg3 from UE 10 to radio network node 12 in e.g. first beam. Thus, the UE 10 may already have a first temporary identity associated to random access sent in a message in the first beam. The RAR may thus comprise only the UL grant, the UL grant and a timing advance command, and/or a beam index of the second beam but without the temporary identity.

Action 1005. The UE 10 may then transmit a message, such as message 3, to the radio network node 12. This message may be a first scheduled uplink transmission on e.g. the PUSCH as indicated by the UL grant.

Figure 11:
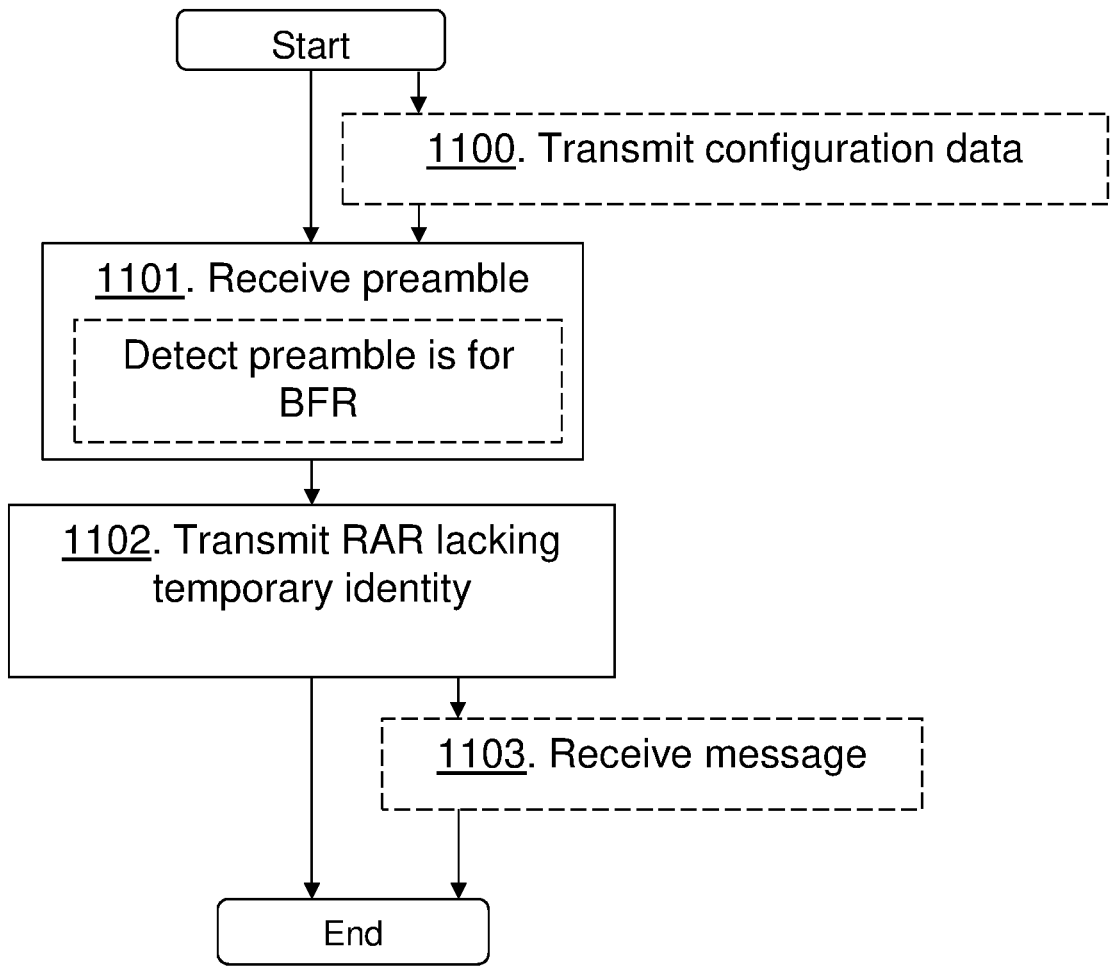
FIG. 11 shows a schematic flowchart depicting a method performed by a radio network node according to embodiments herein.

The method actions performed by the radio network node 12 for handling communication of the UE 10, e.g. handling access procedure from the UE 10, in the wireless communication network 1 according to some embodiments will now be described with reference to a flowchart depicted in FIG. 11. The actions do not have to be taken in the order stated below, but may be taken in any suitable order. Actions performed in some embodiments are marked with dashed boxes. The UE 10 is in a connected mode, of the first beam, connected to the radio network node 12.

Action 1100. The radio network node 12 may transmit configuration data to the UE (10), configuring the UE to use a RAR format with temporary identifier or not Action 1101. The radio network node 12 receives the preamble from the UE 10 of a random access procedure of the second beam. The preamble may indicate the second beam. Furthermore, the preamble or the random access resource used for the preamble is associated with a BFR. E.g. the random access resource used for the transmission such as the preamble, the frequency and/or the time, are allocated for random access procedures for a BFR. Thus, the radio network node 12 may detect that the random access procedure or the preamble is associated with a BFR e.g. based on random access resources used or preamble used. E.g. the radio network node 12 may detect that the preamble is associated with the BFR by detecting that the preamble is of the set of predetermined preambles or the random access resource, used when transmitting the preamble, is of the set of predetermined random access resources.

Action 1102. The radio network node 12 then transmits the RAR, wherein the RAR comprises at least the UL grant and lacks the temporary identity that is used by the MAC entity during a random access procedure. E.g. the RAR comprises the UL grant and is lacking a T-C-RNTI. The RAR may comprise: only the UL grant, the UL grant and a timing advance command; and/or a beam index of the second beam but without the temporary identity. The UE 10 may already have a temporary identity associated to random access sent in a message in the first beam. The radio network node 12 may, in response to detecting that the preamble is associated with the BFR, omitting adding the temporary identifier to the RAR.

Action 1103. The radio network node 12 may then receive a message, e.g. a message 3, from the UE 10. The message 3 is addressed to the temporary C-RNTI allocated in the RAR.

Figure 12:
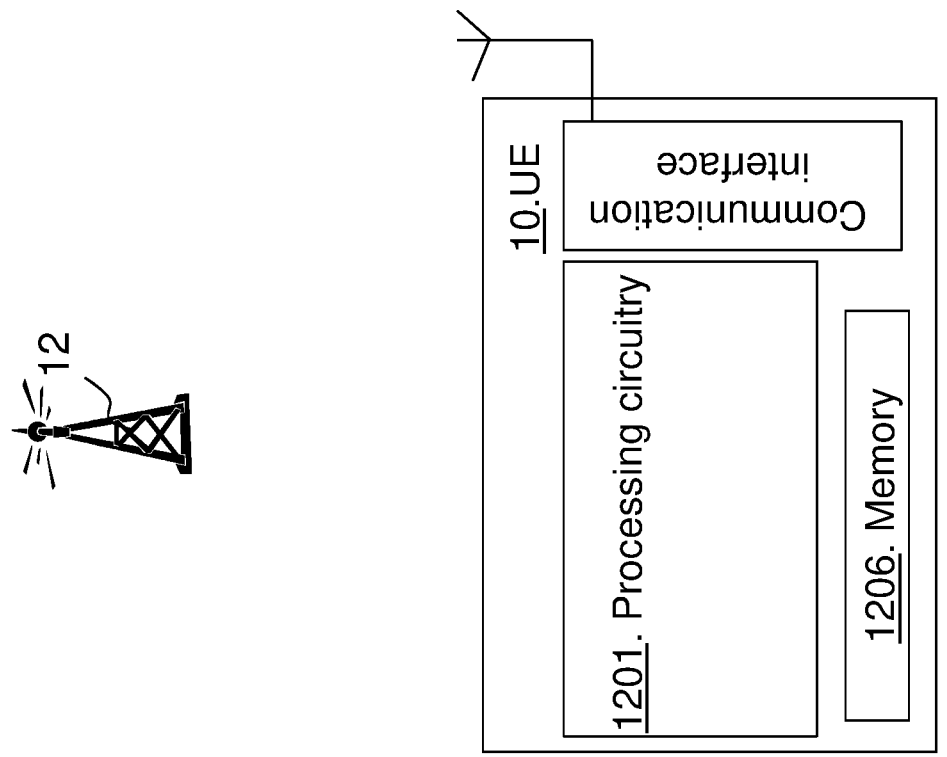
FIG. 12 is a block diagram depicting a UE node according to embodiments herein.
Figure 12:
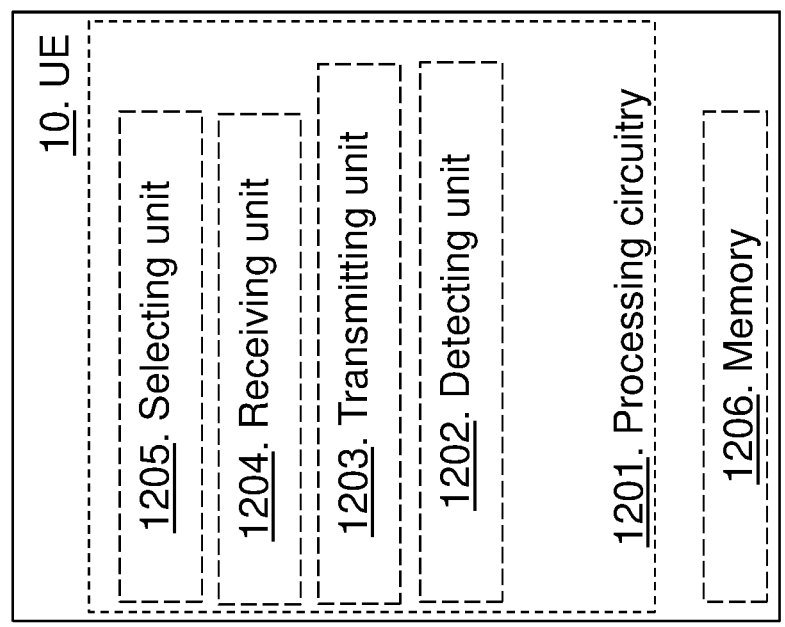
Figure 12:
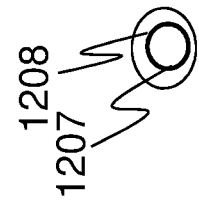

FIG. 12 is a block diagram depicting the UE 10 for handling communication in the wireless communication network according to embodiments herein.

The UE may comprise processing circuitry 1201, such as one or more processors, configured to perform methods herein.

The UE 10 may comprise a detecting unit 1202. The UE 10, the processing circuitry 1201, and/or the detecting unit 1202 is configured to detect a beam failure in a first beam.

The UE 10 may comprise a transmitting unit 1203, e.g. a transmitter or a transceiver. The UE, the processing circuitry 1201, and/or the transmitting unit 1203 is configured to, upon being in a connected mode to the radio network node 12, transmit the preamble in the second beam to the radio network node 12.

The UE 10 may comprise a receiving unit 1204, e.g. a receiver or a transceiver. The UE 10, the processing circuitry 1201, and/or the receiving unit 1204 is configured to receive the RAR from the radio network node 12, wherein the RAR comprises at least the UL grant and lacks a T-C-RNTI.

The UE 10 may comprise a selecting unit 1205. The UE 10, the processing circuitry 1201, and/or the selecting unit 1205 may be configured to select the second beam.

The UE 10 further comprises a memory 1206. The memory comprises one or more units to be used to store data on, such as signal strengths or qualities, IDs of radio network nodes, preambles, RAR information, applications to perform the methods disclosed herein when being executed, and similar.

The UE 10 may further comprise a communication interface such as transmitter, receiver, transceiver and/or one or more antennas.

The methods according to the embodiments described herein for the UE 10 are respectively implemented by means of e.g. a computer program product 1207 or a computer program, comprising instructions, i.e., software code portions, which, when executed on at least one processor, cause the at least one processor to carry out the actions described herein, as performed by the UE 10. The computer program product 1207 may be stored on a computer-readable storage medium 1208, e.g. a disc, a universal serial bus (USB) stick or similar. The computer-readable storage medium 1208, having stored thereon the computer program product, may comprise the instructions which, when executed on at least one processor, cause the at least one processor to carry out the actions described herein, as performed by the UE 10. In some embodiments, the computer-readable storage medium may be a transitory or a non-transitory computer-readable storage medium. Thus, the UE 10 may comprise the processing circuitry and the memory, said memory comprising instructions executable by said processing circuitry whereby said UE is operative to perform the methods herein.

Figure 13:
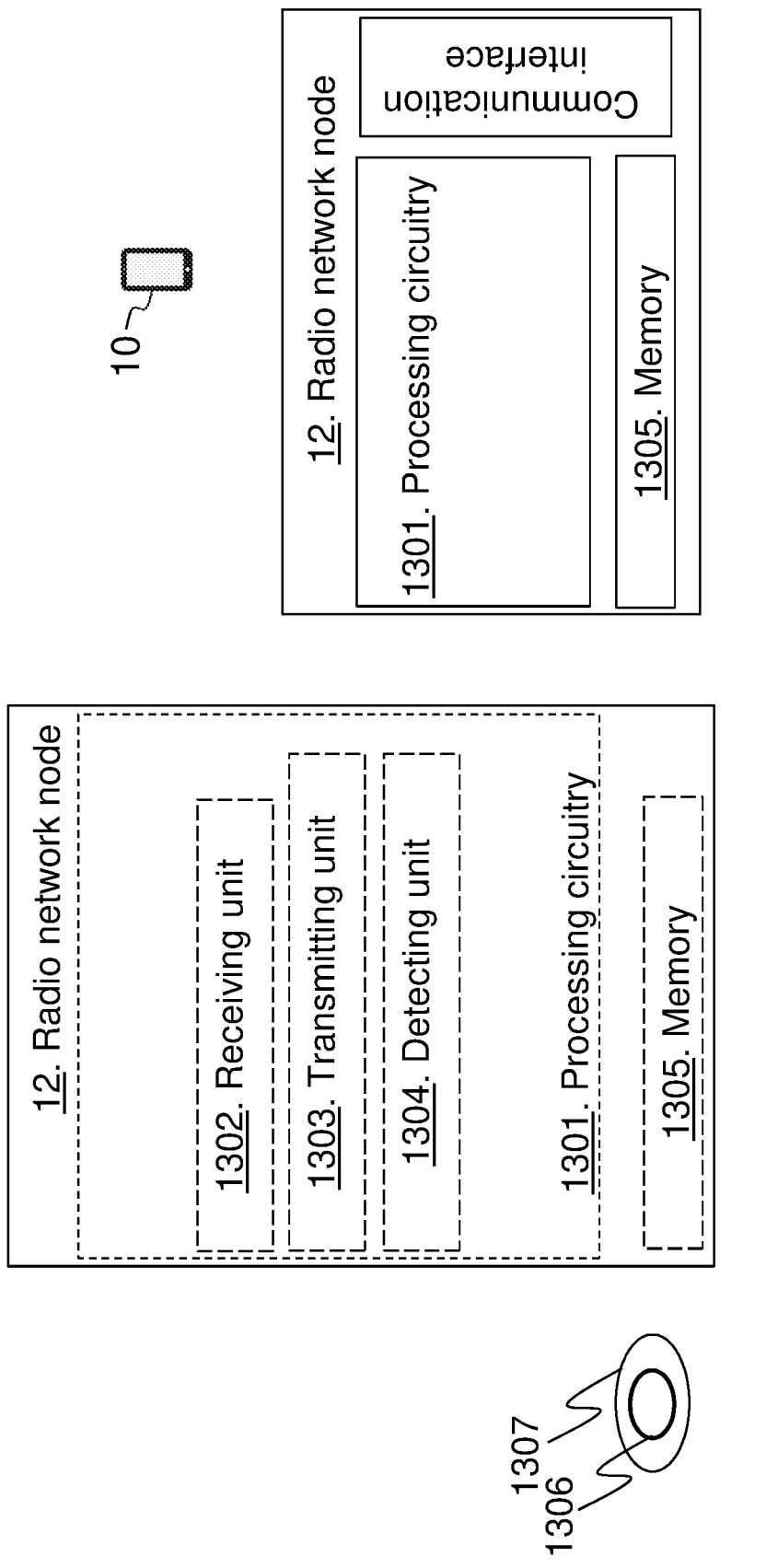
FIG. 13 is a block diagram depicting a radio network node according to embodiments herein.

FIG. 13 is a block diagram depicting the radio network node 12 such as a gNodeB (gNB), for handling communication of the UE 10 in the wireless communication network according to embodiments herein.

The radio network node 12 may comprise processing circuitry 1301, e.g. one or more processors, configured to perform the methods herein.

The radio network node 12 may comprise a receiving unit 1302, a receiver or a transceiver. The radio network node 12, the processing circuitry 1301, and/or the receiving unit 1302 is configured to receive the preamble from the UE 10.

The radio network node 12 may comprise a transmitting unit 1303, e.g. a transmitter or the transceiver. The radio network node 12, the processing circuitry 1301, and/or the transmitting unit 1303 is configured to transmit the RAR to the UE 10, wherein the RAR comprise at least UL grant. For example, the RAR such as the MAC RAR may comprise only the UL grant, or the RAR may comprise only UL grant and timing advance command and/or a beam index of the second beam.

The radio network node 12 may comprise a detecting unit 1304. The radio network node 12, the processing circuitry 1301, and/or the detecting unit 1304 may be configured to detect that the preamble or the random access procedure of the preamble is for a BFR process.

The radio network node 12 further comprises a memory 1305. The memory comprises one or more units to be used to store data on, such as signal strengths or qualities, IDs of radio network nodes, preambles, RAR information, applications to perform the methods disclosed herein when being executed, and similar.

The radio network node 12 may further comprise a communication interface such as transmitter, receiver, transceiver and/or one or more antennas.

The methods according to the embodiments described herein for the radio network node 12 may be respectively implemented by means of e.g. a computer program product 1306 or a computer program, comprising instructions, i.e., software code portions, which, when executed on at least one processor, cause the at least one processor to carry out the actions described herein, as performed by the radio network node 12. The computer program product 1306 may be stored on a computer-readable storage medium 1307, e.g. a disc, a universal serial bus (USB) stick or similar. The computer-readable storage medium 1307, having stored thereon the computer program product, may comprise the instructions which, when executed on at least one processor, cause the at least one processor to carry out the actions described herein, as performed by the radio network node 12. In some embodiments, the computer-readable storage medium may be a transitory or a non-transitory computer-readable storage medium. Thus, the radio network node 12 may comprise the processing circuitry and the memory, said memory comprising instructions executable by said processing circuitry whereby said radio network node is operative to perform the methods herein.

In some embodiments a more general term "radio network node" is used and it can correspond to any type of radio-network node or any network node, which communicates with a UE and/or with another network node. Examples of network nodes are NodeB, MeNB, SeNB, a network node belonging to Master cell group (MCG) or Secondary cell group (SCG), base station (BS), multi-standard radio (MSR) radio node such as MSR BS, eNodeB, network controller, radio-network controller (RNC), base station controller (BSC), relay, donor node controlling relay, base transceiver station (BTS), access point (AP), transmission points, transmission nodes, Remote radio Unit (RRU), Remote Radio Head (RRH), nodes in distributed antenna system (DAS), etc.

In some embodiments the non-limiting term UE or user equipment (UE) is used and it refers to any type of UE communicating with a network node and/or with another UE in a cellular or mobile communication system. Examples of UE are target device, device to device (D2D) UE, proximity capable UE (aka ProSe UE), machine type UE or UE capable of machine to machine (M2M) communication, Tablet, mobile terminals, smart phone, laptop embedded equipped (LEE), laptop mounted equipment (LME), USB dongles etc.

The embodiments are described for 5G or NR. However the embodiments are applicable to any RAT or multi-RAT systems, where the UE receives and/or transmit signals (e.g. data) e.g. Wi-Fi, Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

As will be readily understood by those familiar with communications design, that functions means or circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a UE or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware and/or program or application data. Other hardware, conventional and/or custom, may also be included. Designers of communications devices will appreciate the cost, performance, and maintenance trade-offs inherent in these design choices.

Figure 14:
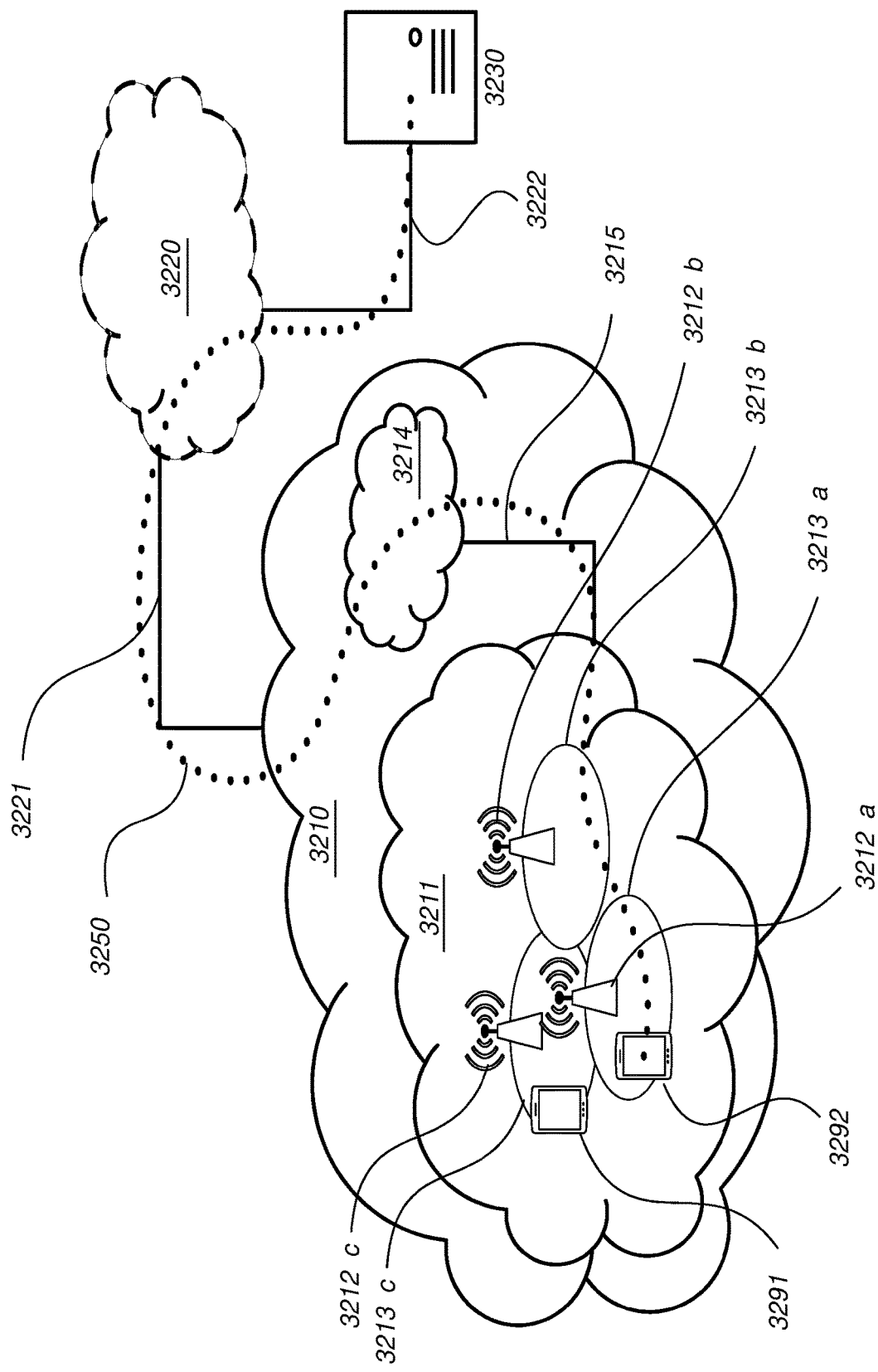
FIG. 14 shows a telecommunication network connected via an intermediate network to a host computer in accordance with some embodiments.

With reference to FIG. 14, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points being examples of the radio network node 12 herein, each defining a corresponding coverage area 3213a, 3213b, 3213c. Each base station 3212a, 3212b, 3212c is connectable to the core network 3214 over a wired or wireless connection 3215. A first user equipment (UE) 3291, being an example of the UE 10, located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 14 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signalling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 15. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 15) served by the base station 3320. The communication interface 3326 may be configured to facilitate a connection 3360 to the host computer 3310. The connection 3360 may be direct or it may pass through a core network (not shown in FIG. 15) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 15:
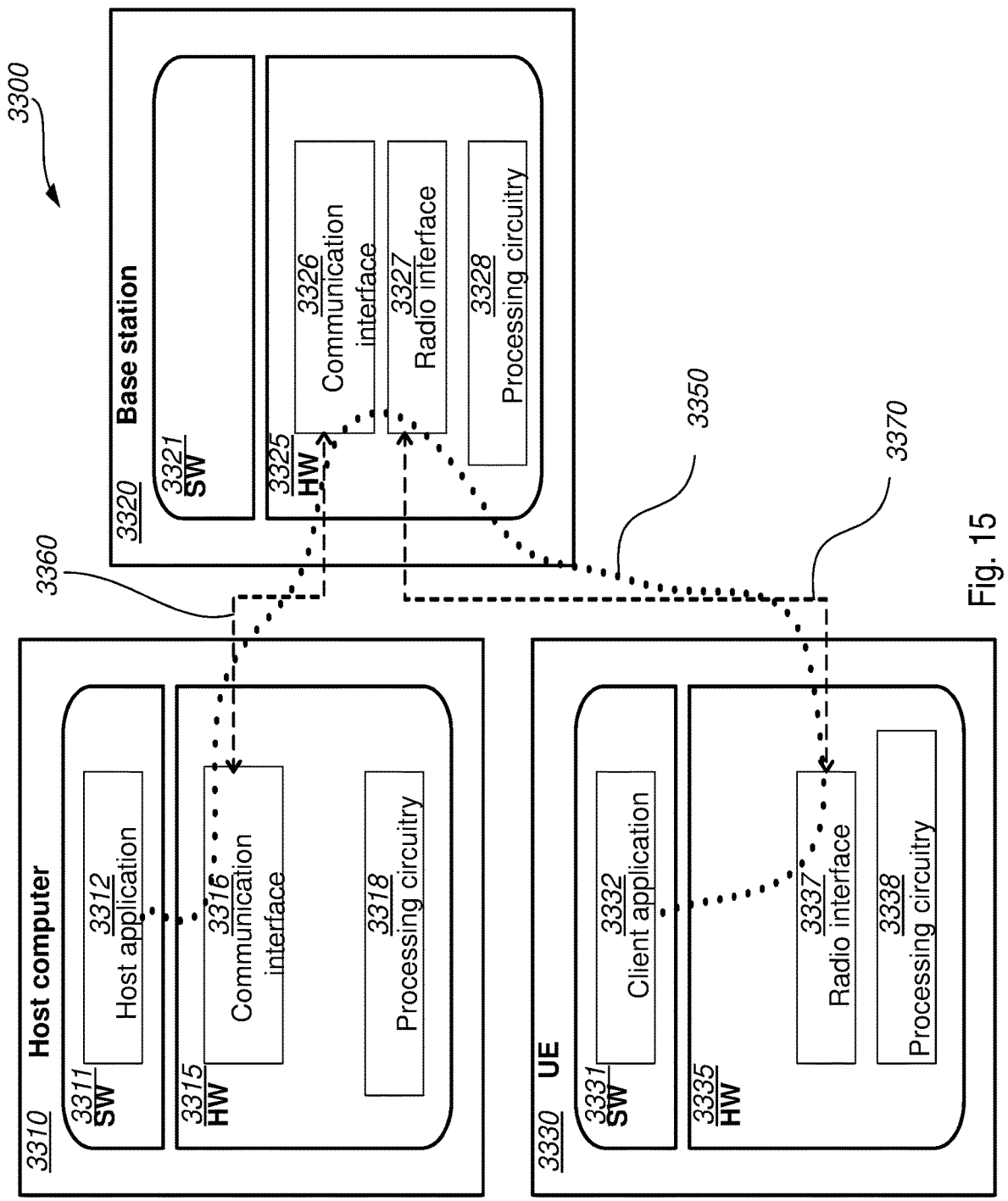
FIG. 15 shows a host computer communicating via a base station with a user equipment over a partially wireless connection in accordance with some embodiments.

It is noted that the host computer 3310, base station 3320 and UE 3330 illustrated in FIG. 15 may be identical to the host computer 3230, one of the base stations 3212a, 3212b, 3212c and one of the UEs 3291, 3292 of FIG. 14, respectively. This is to say, the inner workings of these entities may be as shown in FIG. 15 and independently, the surrounding network topology may be that of FIG. 14.

In FIG. 15, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the latency since the RAR uses a reduced overhead and other services may use the resources and thereby provide benefits such as reduced waiting time and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signalling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 16, 17:
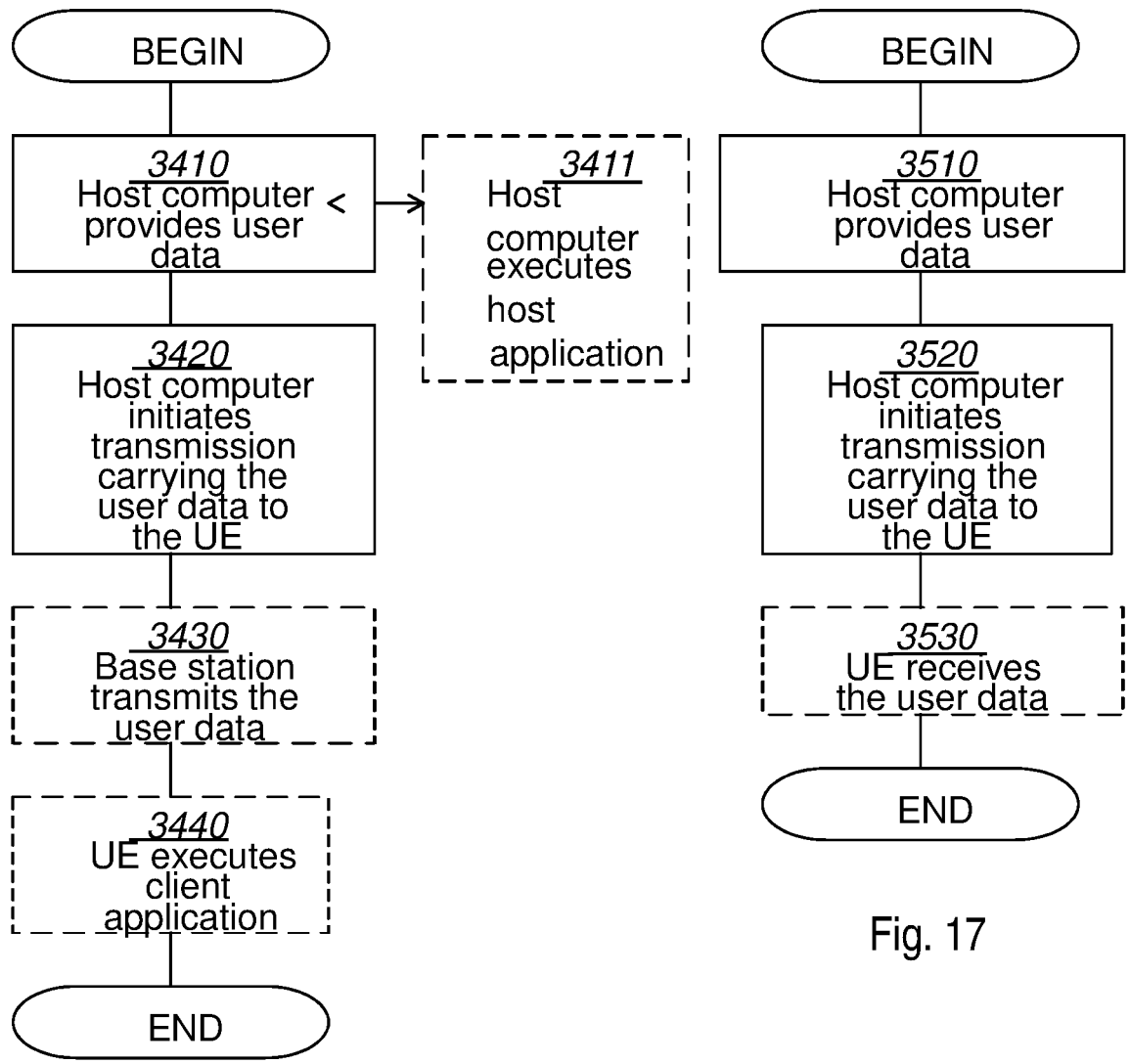
FIG. 16 shows methods implemented in a communication system including a host computer, a base station and a user equipment in accordance with some embodiments.
FIG. 17 shows methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figure 18:
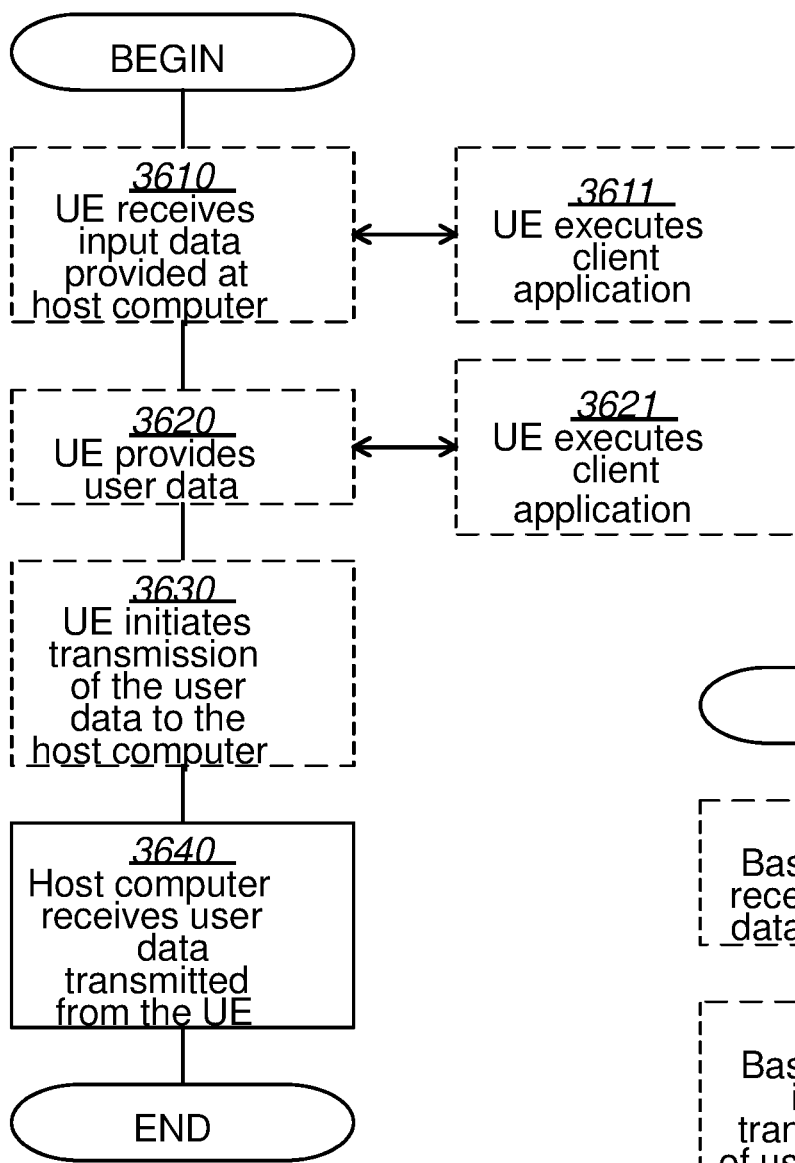
FIG. 18 shows methods implemented in a communication system including a host computer, a base station and a user equipment in accordance with some embodiments.

FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

Figure 19:
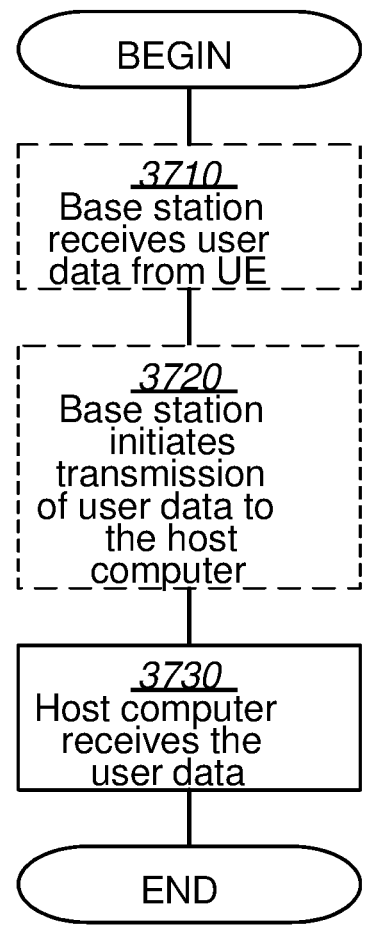
FIG. 19 shows methods implemented in a communication system including a host computer, a base station and a user equipment in accordance with some embodiments.

FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a user equipment, UE, for handling communication in a wireless communication network, the UE being in a connected mode in a first beam connected to a radio network node, the method comprising:
   detecting a beam failure of the first beam;
   transmitting, to the radio network node, a preamble of a random access procedure in a second beam, one of the preamble and a random access resource used for the preamble being associated with a beam failure recovery; and
   receiving a random access response, RAR, from the radio network node, the RAR comprising an uplink, UL, grant, a timing advance command and a beam index of the second beam but without a temporary identity that is used by a medium access control, MAC, entity during a random access procedure, wherein the RAR is applied when the UE detects the beam failure while an uplink time alignment is lost.

2. The method according to claim 1, further comprising: selecting the second beam.

3. The method according to claim 1, wherein the UE already has a first temporary identity associated to random access sent in a message in the first beam.

4. The method according to claim 1, further comprising:
   receiving configuration data from the radio network node, configuring the UE to one of use and not use a RAR format with temporary identifier upon beam failure.

5. The method according to claim 1, wherein the one of the preamble and the random access resource used for the preamble is associated with the beam failure recovery in that the preamble is of a set of predetermined preambles or the random access resource, used when transmitting the preamble, is of a set of predetermined random access resources.

6. A method performed by a radio network node for handling communication of a UE in a wireless communication network, the UE being in a connected mode, of a first beam, connected to the radio network node, the method comprising:
   receiving a preamble of a random access procedure of a second beam, one of the preamble and a random access resource used for the preamble being associated with a beam failure recovery, BFR; and
   transmitting a random access response, RAR, the RAR comprising at least an uplink, UL, grant, a timing advance command and a beam index of the second beam and lacking a temporary identity that is used by a medium access control, MAC, entity during a random access procedure, wherein the RAR is applied when the UE detects a beam failure while an uplink time alignment is lost.

7. The method according to claim 6, wherein the UE already has a temporary identity associated to random access sent in a message in the first beam.

8. The method according to claim 6, further comprising:
transmitting configuration data to the UE, configuring the UE to one of use and not use a RAR format with temporary identifier.

9. The method according to claim 6, wherein receiving the preamble of the second beam comprises detecting that the preamble is associated with the BFR, and wherein detecting that the preamble is associated with the BFR by detecting one of that the preamble is of a set of predetermined preambles and the random access resource, used when transmitting the preamble, is of a set of predetermined random access resources, and wherein transmitting the RAR further comprises, in response to detecting that the preamble is associated with the BFR, omitting adding the temporary identifier to the RAR.

10. A user equipment, UE, for handling communication in a wireless communication network, wherein the UE is configured to:
detect a beam failure of a first beam, the UE being in a connected mode in the first beam connected to a radio network node;
transmit, to the radio network node, a preamble of a random access procedure in a second beam, one of the preamble and a random access resource used for the preamble being associated with a beam failure recovery; and
receive a random access response, RAR, from the radio network node, the RAR comprising an uplink, UL, grant, a timing advance command and a beam index of the second beam but without a temporary identity that is used by a medium access control, MAC, entity during a random access procedure, wherein the RAR is applied when the UE detects the beam failure while an uplink time alignment is lost.

11. The UE according to claim 10, wherein the UE is further configured to select the second beam.

12. The UE according to claim 10, wherein the UE already has a first temporary identity associated to random access sent in a message in the first beam.

13. The UE according to claim 10, wherein the UE is further configured to receive configuration from the radio network node, configuring the UE to one of use and not use a RAR format with temporary identifier upon beam failure.

14. The UE according to claim 10, wherein one of the preamble and the random access resource used for the preamble is associated with the beam failure recovery in that the preamble is of a set of predetermined preambles or the random access resource, used when transmitting the preamble, is of a set of predetermined random access resources.

15. A radio network node for handling communication of a UE in a wireless communication network, the radio network node being configured to:
receive, from the UE being in a connected mode, of a first beam, connected to the radio network node, a preamble of a random access procedure of a second beam, one of the preamble and a random access resource used for the preamble being associated with a beam failure recovery, BFR; and
transmit a random access response, RAR, to the UE, the RAR comprising at least an uplink, UL, grant, a timing advance command and a beam index of the second beam and lacking a temporary identity that is used by a medium access control, MAC, entity during a random access procedure, wherein the RAR is applied when the UE detects a beam failure while an uplink time alignment is lost.

16. The radio network node according to claim 15, wherein the UE already has a temporary identity associated to random access sent in a message in the first beam.

17. The radio network node according claim 15, wherein the radio network node is further configured to transmit configuration to the UE, configuring the UE to use a RAR format with temporary identifier or not.

18. The radio network node according to claim 15, wherein the UE is configured to detect that the preamble is associated with the BFR, and wherein the UE is configured to detect that the preamble is associated with the BFR by being configured to detect one of that the preamble is of a set of predetermined preambles and the random access resource, used when transmitting the preamble, is of a set of predetermined random access resources and wherein the radio network node is configured to, in response to detecting that the preamble is associated with the BFR, omit adding the temporary identifier to the RAR.

* * * * *